Patented Apr. 21, 1942

UNITED STATES PATENT OFFICE 2,280,504

PROCESS FOR PRODUCING COMPOUNDS OF THE DIARYL SERIES

Werner Zerweck and Karl Schütz, Frankfort-on-the-Main-Fechenheim, Germany, assignors to General Aniline & Film Corporation, a corporation of Delaware No Drawing. Application March 1, 1939, Serial No. 259,132. In Germany March 3, 1938

1 Claim. (Cl. 260—315)

Our present invention relates to a process for producing compounds of the diaryl series.

In contradistinction to the common view, based on various publications, it is possible by a reaction applicable within a large scope and while restraining undesirable by-reactions to replace the aminogroup of diazotisable aromatic or heterocyclic amines by an aryl radicle, i. e. the radicle of an aromatic as well as a heterocyclic compound. The present process consists in converting the amine in question in a usual manner into the diazocompound, separating the diazocompound in a suitable manner in a water insoluble or scarcely soluble form, a step, which has not yet been carried out hitherto, and acting with the diazocompound in this form on an aromatic or heterocyclic fundamental compound or derivatives thereof. The transformation of the diazocompound into the water insoluble or scarcely soluble form may be carried out by different steps, for instance by converting it into a water insoluble or scarcely soluble salt or double salt, particularly the zinc chloride double salt, or by decomposing it by means of non-coupling primary or secondary amines, whereby a water insoluble or scarcely soluble diazoamino-compound is separated.

While taking care to realize the aforesaid steps the general condensation reaction is applicable within a large scope, a fact, which is contrary to the common knowledge of the narrow limit of the reaction, which is known under the name of Friedel-Crafts reaction when using as condensing agent aluminium chloride, which reaction often misserves.

As amines all of the diazotisable aromatic and heterocyclic amines are suitable, besides aniline the nuclear substituted primary amines of the benzene series, such as the toluidines, halogenated and nitrated anilines, the amines of the naphthalene-diphenyl and anthraquinone series, of the carbazole series and the like. As second reaction component there may be used the aromatic hydrocarbons and heterocyclic fundamental bodies, such as benzene, toluene, the xylenes, diphenyl, naphthalene, thiophene, pyridine, quinoline and their derivatives, moreover compounds containing a negative substituent, such as nitrobenzene, nitronaphthalene, benzophenone, benzoic acid ester, phthalic acid anhydride, benzaldehyde and the like and particularly the halogenated compound.

When applying for the condensation reaction with a water insoluble or scarcely soluble salt or double salt of the diazocompound it is advisable in many cases to add a condensing agent or carrier, particularly halogeno compounds of aluminium and iron. When separating the diazocompound as water insoluble or scarcely soluble diazoamino compound it is necessary before the condensation reaction to split off the diazoaminocompounds by means of an acid, for instance a hydrogen halide in the heat, or an agent setting free an acid.

The compounds of the diaryl series, which were hitherto partly only difficultly, partly not accessible, but obtainable according to the present process within a large scope which could not have been foreseen, are partly new products, they are important intermediates for the production of dyestuffs and pharmaceutical products, partly they are dyestuffs themselves.

In order to further illustrate our invention the following examples are given, the temperatures being in degrees centigrade.

Example 1

The diazo compound of 162 parts of 3,4-dichloraniline is combined with an excess of an aqueous dimethylamine solution. The isolated diazoamino compound is then dissolved in about 4000 parts of nitrobenzene and the solution is heated at about 90° while introducing a slow current of dry hydrochloric acid gas. When no more diazoamino compound can be detected, dilute hydrochloric acid and water are added and the reaction liquor is fractionated in vacuo. When the nitrobenzene has been distilled off the main constituent passes over under 12 mm. pressure from 216 to 230°. It solidifies rapidly to a light yellow cake. According to the result of analysis the reaction product is a nitrodichlorodiphenyl.

When using instead of 162 parts of 3,4-dichloroaniline 93 parts of aniline a mixture of mainly 2-nitrodiphenyl and a little amount of 4-nitrodiphenyl is obtained. When recrystallizing from alcohol both compounds are obtained in a pure state showing the melting points as described in literature.

Example 2

149 parts of 3,3-dimethyl-1-phenyl-triazene (1), i. e. the diazoamino compound derived from diazotized aniline and dimethylamine, a colorless oil, which boils at 110° under 11 mm., are dissolved in about 3000 parts of molten benzophenone. At higher temperatures, for instance at 90 to 100°, dry hydrochloric acid gas is introduced until no more of the diazoaminocompound can be detected. The dimethylamine hydrochloride formed by the splitting off reaction is removed by extraction with hot water and the residue is fractionated in vacuo. The fraction, which boils at 203 to 216° under 4 mm., crystallizes from alcohol as vitreous rectangular plates of 88 to 89° melting point, being probably the 2-benzoyldiphenyl, whereas the fraction passing over at 216 to 225° crystallizes from alcohol as lustrous sheds melting at 102°, being the 4-benzoyldiphenyl as described in literature.

When using instead of benzophenone about the same quantity of phthalic acid anhydride advantageously with the addition of about 1000 parts of acetic acid anhydride a mixture of 2,3-diphenyl-dicarboxylic acid anhydride of 144 to 145° melting point and of 3,4-diphenyldicarboxylic acid anhydride of 134 to 135° melting point is obtained. The mixture can be divided into the components by distillation in vacuo.

When using 218 parts of 3,3-dimethyl-(3,4-dichlorophenyl)-triazene (1) and about 3000 parts of benzaldehyde and working otherwise as described above as the main product a dichlorodiphenylaldehyde passing over at 180 to 190° under 4 mm. and melting at 54 to 56° is obtained, moreover a little amount of an isomeric compound passing over at 190 to 200° and melting at 65°. Both compounds are new substances. The phenylhydrazone of the main product melts when recrystallized from alcohol at 140°, that of the isomeric product at 155°.

Example 3

177 parts of the diazoaminocompound derived from 1,2-dimethyl-4-aminobenzene and dimethylamine are dissolved in about 1000 parts of benzene and while boiling dry hydrochloric acid gas is introduced. When the reaction has been finished the reaction mass is extracted with a dilute caustic alkali solution and thereafter with water, the benzene is distilled off and the residue is distilled in vacuo. As main product the 3,4-dimethyldiphenyl, a new compound, passes over at about 140–145° under 9 mm. It melts at 33°.

In an analogous manner when starting from 1,3-dimethyl-4-aminobenzene the 2,4-dimethyldiphenyl is obtained boiling at 125° to 127° under 10 mm.

In a similar manner the 4-aminodiphenyl is converted into a diazoaminocompound and then condensed with 1,2-dichlorobenzene. The formed 3,4-dichloroterphenyl of the formula

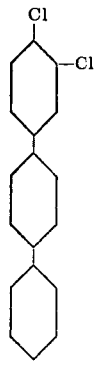

being a new compound melts when recrystallized from glacial acetic acid at 150 to 151°.

In an analogous manner the diazoaminocompound derived from 2-amino-4,5-dichloro-1-methylbenzene and dimethylamine yields when condensed with benzene mainly the 2-methyl-4,5-dichlorodiphenyl, boiling at 180 to 181° under 17 mm., that of 1-methoxy-2-amino-4,5-dichlorobenzene yields the 2-methoxy-4,5-dichlorodiphenyl, likewise a new compound, melting at 85 to 86°, that of 1-phenoxy-2-amino-4,5-dichloro benzene yields the 2-phenoxy-4,5-dichlorodiphenyl of 89 to 90° melting point, likewise a new compound.

Example 4

263 parts of the diazoaminocompound of the formula

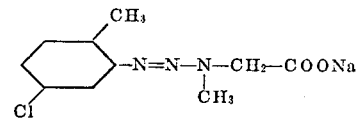

obtainable from diazotized 4-chloro-2-amino-1-methylbenzene and sarkosine, are suspended in about 2000 parts of benzene, 200 parts of aluminiumchloride are added and the mixture is heated some hours to boiling under reflux. In this manner the 2-methyl-5-chlorodiphenyl, boiling at 139 to 140° under 8 mm., is obtained.

Example 5

The diazoaminocompound obtainable from 162 parts of 3,4-dichloroaniline and an excess of dimethylamine is dissolved in about 1000 parts of dry benzene, the solution is added while stirring to a mixture of 160 parts of aluminium chloride and about 500 parts of benzene at temperatures not exceeding essentially 40°. Then the mixture is heated to boiling for some time. As the main product the 3,4-dichlorodiphenyl of 49 to 50° which has been mentioned above is obtained.

Instead of adding aluminiumchloride one may slowly add some molecular proportions of formic acid to the boiling solution benzene solution of the aforesaid diazoaminocompound. When reacting with the diazoaminocompound of 3,4-dichloroaniline and dimethylamine in the presence of aluminiumchloride on an excess of molten diphenyl, a mixture is obtained of 3,4-dichloroterphenyl of a melting point of 150 to 151° (as mentioned above) and probably of 3,4-dichloro-2'-phenyldiphenyl of the formula

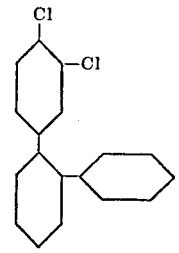

melting at 79 to 80°, both being new compounds.

Example 6

The diazo compound of 324 parts of 2.3-dichloroaniline is combined with an excess of an aqueous solution of diethylamine. The isolated diazoamino-compound is dissolved in about 3000 parts of benzene and boiled under reflux by addition of 300 to 400 parts of aluminium chloride. The mixture is worked up as described in the foregoing examples and distilled in vacuo. The 2.3-dichlorodiphenyl passes over at 170–176° at a pressure of 19 mm.

2.4.5-trichloro-diphenyl may be prepared from 2.4.5-trichlorodiphenyl in a similar manner. The product melts when recrystallized from petroleum ether at 78–79°.

Example 7

The diazo-compound of 142 parts of 4-aminophthalic acid-diethyl ester is precipitated with an excess of an aqueous dimethylamine solution and then dissolved in about 2000 parts of benzene. In the boiling solution dry gaseous hydrochloride acid is slowly introduced and the reaction being finished the mixture is worked up as described in the foregoing examples. The new diphenyl-3.4-dicarboxylic acid-diethyl ester boils at 204° at a pressure of 4 mm.

The methylester of o-(α-naphthyl)-benzoic acid may be prepared in an analogous manner by condensing at 90-100° the diazo amino compound of anthranilic acid-methyl-ester with dimethyl-amine and molten naphthalene. The product boils at 210 to 213° at a pressure of 12 mm. After recrystallizing from benzene the melting point is 85-86°.

Example 8

The diazo compound of 210 parts of 3-amino-N-ethyl-carbazole is precipitated with an excess of an aqueous solution of dimethylamine. The isolated diazoamino-compound is dissolved in about 4000 parts of benzene and dry gaseous hydrochloric acid is slowly introduced. The reaction being finished the mixture is worked up as described in the foregoing examples and then distilled in vacuo. The new 3-phenyl-N-ethyl-carbazole boils at 232° at a pressure of 2-3 mm. The product melts when recrystallized from alcohol at 125-126°.

We claim:

A process for producing compounds of the diaryl series which process consists in transforming the diazocompound of an amine selected from the group consisting of amines of the aromatic series and amines of the carbazole series into a scarcely water soluble diazoaminocompound and while splitting off the diazoaminocompound by the action of an acid agent condensing with an aromatic compound in the molecule of which only members of the group consisting of hydrogen, halogen, nitro-, aldehyde-, ketone- and carboxylic acid groups are attached to the ring members.

WERNER ZERWECK.
KARL SCHÜTZ.